(12) United States Patent
Zhang et al.

(10) Patent No.: US 6,974,926 B2
(45) Date of Patent: Dec. 13, 2005

(54) SORTING OF SINGLE-WALLED CARBON NANOTUBES USING OPTICAL DIPOLE TRAPS

(75) Inventors: Yuegang Zhang, Cupertino, CA (US); Eric Hannah, Pebble Beach, CA (US); Tae-Woong Koo, South San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 10/669,150

(22) Filed: Sep. 23, 2003

(65) Prior Publication Data

US 2004/0120880 A1 Jun. 24, 2004

Related U.S. Application Data

(63) Continuation-in-part of application No. 10/107,833, filed on Mar. 26, 2002, now Pat. No. 6,774,333.

(51) Int. Cl.[7] .............................................. B03C 7/00
(52) U.S. Cl. .................. 209/129; 209/155; 977/DIG. 1
(58) Field of Search .............................. 209/129, 142, 209/155, 576, 579, 585, 586; 356/309, 311, 356/318; 977/DIG. 1

(56) References Cited

U.S. PATENT DOCUMENTS

| | | | | |
|---|---|---|---|---|
| 5,245,466 A | * | 9/1993 | Burns et al. ................ | 359/296 |
| 6,514,767 B1 | | 2/2003 | Natan ........................... | 436/166 |
| 2003/0159999 A1 | * | 8/2003 | Oakey et al. ................ | 210/695 |
| 2003/0168385 A1 | | 9/2003 | Papadimitrakolpoulos | |
| 2005/0061714 A1 | * | 3/2005 | Sibbett et al. ............... | 209/128 |
| 2005/0103690 A1 | * | 5/2005 | Kawano et al. ............. | 209/576 |

FOREIGN PATENT DOCUMENTS

WO WO02/39104 5/2002

OTHER PUBLICATIONS

Kawata et al., Movement of micrometer-sized particles in the evanescent field of a laser beam, Optics Letters, vol. 17, No. 11, Jun. 1, 1992.*
Plewa et al., Processing carbon nanotubes with holographic tweezers, Optics Express, vol. 12, No. 9, May 3, 2004.*
Narayan, Proposed strategy to sort semiconducting nanotubes by radius and chirality, arXiv:cond-mat/0501206 v2, Mar. 14, 2005.*
Chattopadkyay, et al, "A Route for Bulk Separation of Semiconducting From Metallic Single-Wall Carbon Nanotubes", *J. Am. Chem. Soc.* 125:3370-3375, (2003), date ok.

(Continued)

*Primary Examiner*—Donald P. Walsh
*Assistant Examiner*—Joseph C Rodriguez
(74) *Attorney, Agent, or Firm*—DLA Piper Rudnick Gray Cary US LLP

(57) ABSTRACT

In embodiments of the present invention, the electric field of a focused laser beam induces a dipole in a single-walled carbon nanotube. The single-walled carbon nanotube has one or more resonant frequencies. When the frequency of the laser beam is less than a resonance frequency of the single-walled carbon nanotube, the single-walled carbon nanotube may be trapped and the laser beam may move the single-walled carbon nanotube from a first microfluidic laminar flow to a second microfluidic laminar flow. When the frequency of the laser beam is higher than a resonant frequency of the single-walled carbon nanotube, the single-walled carbon nanotube may be repelled and the laser beam may not move the single-walled carbon nanotube.

27 Claims, 9 Drawing Sheets

OTHER PUBLICATIONS

Doering, et al., "Spectroscopic Tags Using Dye-Embedded Nanoparticles and Surface -Enhanced Raman Scattering", *Analytical Chemistry*, :5-9, 2004.

Dresselhaus, et al., "Advances in Physics 2000" 49(6):705-814, (2000).

Krupke, et al., "Separation of Metallic from Semiconducting Single-Walled Carbon Nanotubes", Science Express, www.scienceexpress.org (Jun. 26, 2003).

Mulvaney, et al., "Glass-Coated, Analyte-Tagged Nanoparticles: A New Tagging System Based on Detection with Surface-Enhanced Raman Scattering", *Am Chem Soc*. 19:4784-4790 (2003), date ok.

Papadimitrakopoulos, et al., "A Route for the Bulk Separation of Metallic from Semiconducting Singel Wall Carbon Nanotubes," www.aps.org/meet/MAR03/baps/abs/S670010.html, 2003.

Rosen, et al., "Manipulation and Separation of Carbon Nanotubes Based on Their Chirality", www.aps.org/meet/MAR03/baps/abs/S660012.html, 2003.

Strano, et al., "Electronic Structure Control of Single—Walled Carbon Nanotube Functionalization", *Sci*. 301:1519-1522 (Sep. 12, 2003).

Strano, et al, "Selective Reactivity of Single Walled Carbon Nanotubes in Solution", www.aps.org/meet/MAR03/baps/abs/S670011.html, 2003.

Zhang, et al., "Effect of Light Irradiation on Oxidation of HiPco Single-Wall Carbon Nanotubes", www.aps.org/meet/MAR03/baps/abs/S67005,html, 2003.

Zheng, et al., "Structure-Based Carbon Nanotube Sorting by Sequence-Dependent DNA Assembly", *Sci*. 302:1545-1548, (Nov. 2003).

* cited by examiner

SORTING OF SINGLE-WALLED CARBON NANOTUBES USING OPTICAL DIPOLE TRAPS

CROSS-REFERENCE TO RELATED APPLICATIONS

The present application is a continuation-in-part of and claims benefit of priority to U.S. application Ser. No. 10/107,833, filed Mar. 26, 2002.

BACKGROUND

1. Field

Embodiments of the present invention relate to single-walled carbon nanotubes and, in particular, to sorting single-walled carbon nanotubes.

2. Discussion of Related Art

Carbon nanotubes have evoked considerable interest since their discovery in the early 1990s. Potential uses include everything from transistors, digital memory, and miniature electron emitters for displays, to hydrogen gas storage devices for the next generation of environmentally friendly automobiles.

Typically, a batch of single-walled carbon nanotubes available to potential users has a mixture of different types of single-walled carbon nanotubes. For example, in a batch of single-walled carbon nanotubes there may be metallic single-walled carbon nanotubes and semiconductor single-walled carbon nanotubes. Within the semiconductor single-walled carbon nanotubes there may be single-walled carbon nanotubes of different lengths, diameters, and/or chiralities. Each type of single-walled carbon nanotube has different properties (e.g., electrical, chemical, optical, mechanical) that are particularly suitable for different applications. Because they usually come as a mixture not being able to separate the different single-walled carbon nanotubes can be troublesome when attempting to utilize a particular type of single-walled carbon nanotube for a specific application.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
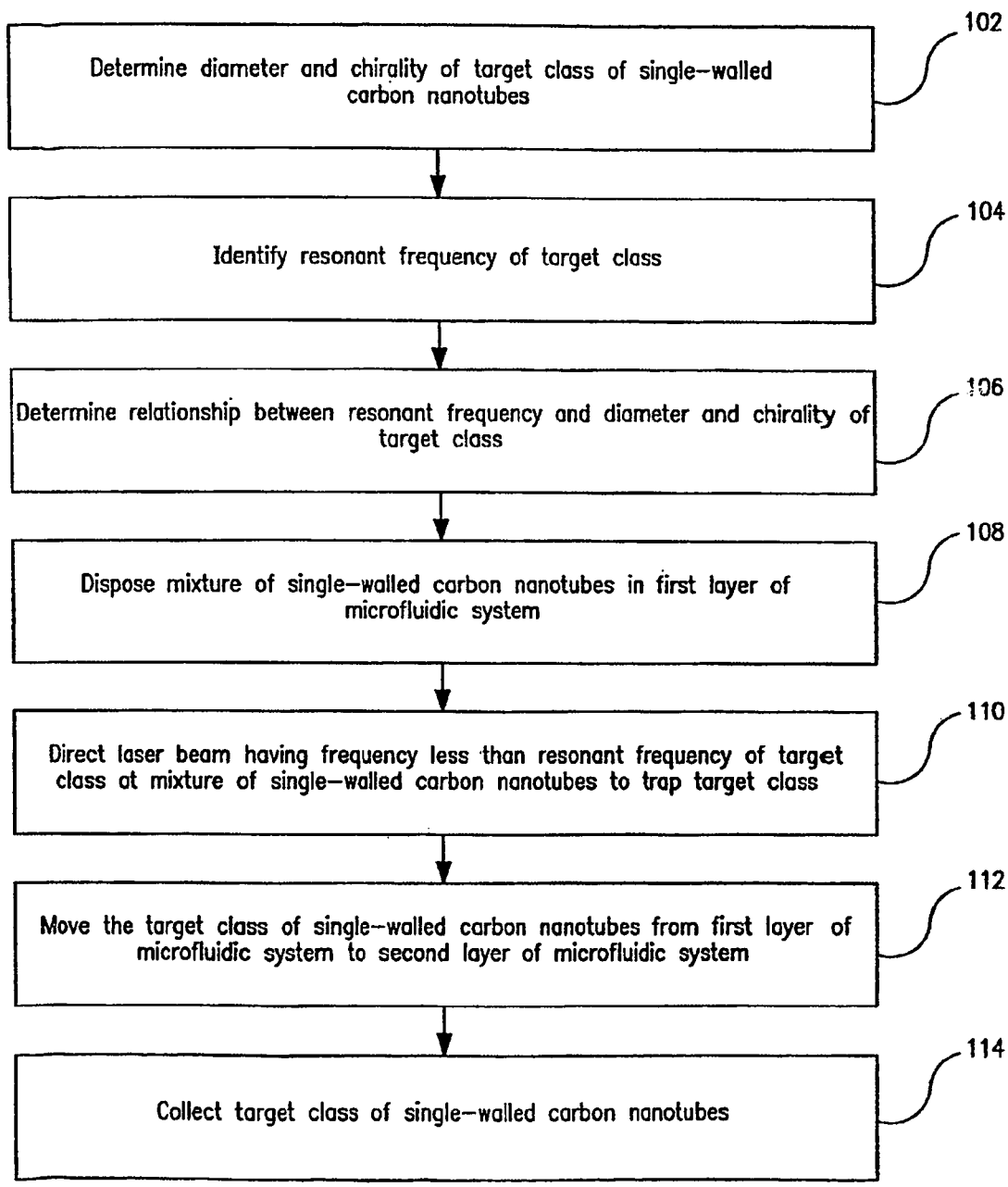
FIG. 1 is a flow chart illustrating process for sorting semiconductor single-walled carbon nanotubes from metallic single-walled carbon nanotubes according to an embodiment of the present invention.

FIG. 1 is a flow chart illustrating a process 100 for sorting semiconductor single-walled carbon nanotubes from metallic single-walled carbon nanotubes according to an embodiment of the present invention. The process 100 will be described as multiple discrete operations performed in turn in a manner that is most helpful in understanding embodiments of the present invention. However, the order in which the operations are described should not be construed to imply that the operations are necessarily order dependent or that they be performed in the order in which they are presented. Of course, the process 100 is only an example process and other processes may be used.

In a block 102, the process 100 determines diameter and chirality (e.g., arm chair, zigzag, helical (or chiral)) corresponding a target class of single-walled carbon nanotubes. A single-walled carbon nanotube can be modeled as a strip of graphite sheet rolled up into a seamless cylinder with or without end caps. It is "single-walled" because its wall is only a single atom thick. The cylinder is generated when a graphene sheet is wrapped such that an atom on one edge of the sheet coincides with an atom on the other edge of the sheet. The vector pointing from the first atom towards the second atom is called the chiral vector and the length of the "chiral vector" is equal to the circumference of the single-walled carbon nanotube. The direction of the single-walled carbon nanotube axis is perpendicular to the chiral vector.

Figure 2:
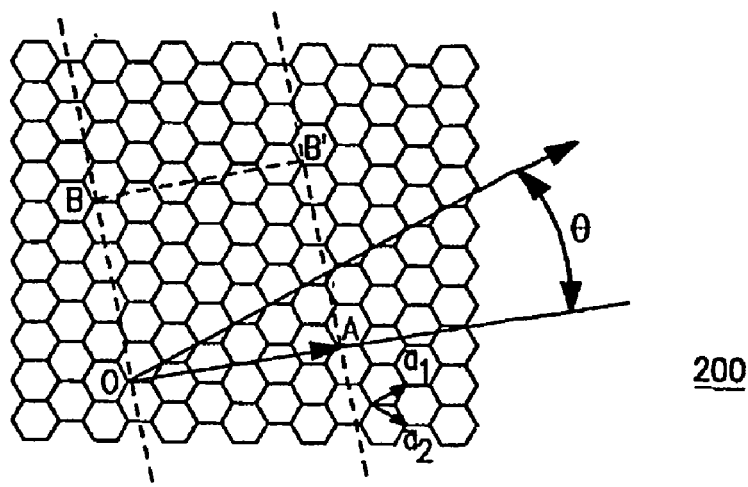
FIG. 2 is a two-dimensional diagram of a hexagonal lattice of a single-walled carbon nanotube showing the chiral vector and the chiral angle.

FIG. 2 is a two-dimensional diagram 200 of a hexagonal lattice of a single-walled carbon nanotube showing the chiral vector and the chiral angle. The chiral vector $C_h$ is defined on the hexagonal lattice as $C_h = n\hat{a}_1 + m\hat{a}_2$, where $\hat{a}_1$ and $\hat{a}_2$ are unit vectors, and n and m are integers. The chiral angle $\theta$ is measured relative to the direction defined by $\hat{a}_1$. The example diagram 200 has been constructed for (n, m)=(4, 2), and the unit cell of this single-walled carbon nanotube is bounded by OAB'B. To form the single-walled carbon nanotube, imagine that this cell is rolled up so that O meets A and B meets B', and the two ends are capped.

Different types of carbon nanotubes have different values of n and m. Zigzag nanotubes correspond to (n, 0) or (0, m) and have a chiral angle of 0°, armchair nanotubes have (n, n) and a chiral angle of 30°, while chiral nanotubes have general (n, m) values and a chiral angle of between 0° and 30°. In embodiments of the present invention, scanning tunneling microscopy may be used to determine and display atomic structures for single-walled carbon nanotubes.

Single-walled carbon nanotubes that have different lengths, diameters, and/or chiral vectors have different electronic properties. For example, depending on their chiral vector, single-walled carbon nanotubes with small diameters are either semiconductor single-walled carbon nanotubes or metallic single-walled carbon nanotubes. Metallic single-walled carbon nanotubes may conduct electricity at room temperature. Semiconductor single-walled carbon nanotubes do not conduct at room temperature.

Referring back to FIG. 1, in a block 104, the process 100 identifies a resonant frequency of the target class of single-walled carbon nanotubes. In one embodiment, a laser beam emitting a particular frequency of light may be scanned across the mixture of single-walled carbon nanotubes. The electric field component of the light interacts with one or more single-walled carbon nanotubes. The electric field component induces dipole moments in the target single-walled carbon nanotubes.

When the frequency of the laser beam is equivalent to a resonant frequency of the target single-walled carbon nanotubes, the induced dipoles in the target single-walled carbon nanotubes will resonate. When the frequency of the laser beam is lower than a resonant frequency of the single-walled carbon nanotubes, the single-walled carbon nanotubes will be attracted to the laser beam (i.e., optically trapped). When the frequency of the laser beam is higher than a resonant frequency of the single-walled carbon nanotubes, the laser beam will repel the single-walled carbon nanotubes. (When the frequency of the laser beam is around a resonant frequency of the single-walled carbon nanotubes, the optical trapping of single-walled carbon nanotubes is unstable.)

The induced dipole moment of the neutral particle in the electric field may be represented by $P=\epsilon_0\chi E$. P is the dipole moment per unit volume (or polarization) of the neutral particle in the electric field of the laser beam. $\epsilon_0$ is the permittivity of free space and is a constant. $\chi(\omega)$ is the dielectric susceptibility of a neutral particle to become a dipole (i.e., to become polarized). The dielectric susceptibility $\chi(\omega)$ depends on the electronic structure of the particle as well as the surrounding medium (e.g., free space, water, etc).

Figure 3:
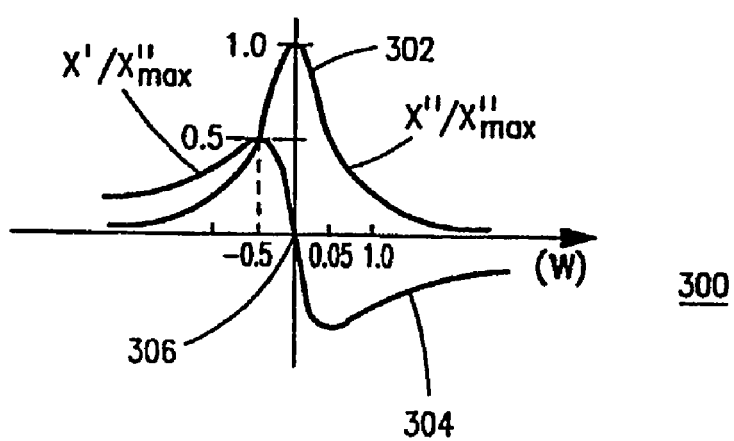
FIG. 3 is a graphical representation showing dielectric susceptibility with respect to resonant frequency.

FIG. 3 is a graphical representation 300 showing dielectric susceptibility $\chi$ of a neutral particle (i.e., a single-walled carbon nanotube) to become polarized with respect to laser beam frequency $\omega$. Dielectric susceptibility is a complex function $\chi(\omega)=\chi'(\omega)+i\chi''(\omega)$, that depends on the frequency $\omega$ of the laser beam attempting to polarize it. The graphical representation 300 shows an imaginary part 302 to the dielectric susceptibility, which is always positive, and a real part 304, which changes sign when crossing a resonant frequency (point 306).

The sign of the real part of dielectric susceptibility $\chi'(\omega)$ determines whether the single-walled carbon nanotube will be attracted to or repelled from the electric field component of the laser beam. If the sign of the real part $\chi'(\omega)$ is positive, then the laser beam will attract the single-walled carbon nanotube. If the sign of the real part of $\chi'(\omega)$ is negative, then laser beam will repel the single-walled carbon nanotube. The sign of the real part of dielectric susceptibility $\chi'(\omega)$ is determined by the frequency $\omega$ of the laser beam. If the frequency $\omega$ of the laser beam is lower than the resonant frequency of the single-walled carbon nanotube, then the sign of the real part of dielectric susceptibility $\chi'(\omega)$ is positive. If the frequency $\omega$ of the laser beam is higher than the resonant frequency of the single-walled carbon nanotube, then the sign of the real part of dielectric susceptibility $\chi'(\omega)$ is negative.

The total interaction system energy U (i.e., the energy that is a product of the dipole moment and the electric field of the laser beam) may be represented by $U=-\frac{1}{2}P\cdot E$, where E is the electric field component of the laser beam. The total interaction system energy U also may be represented by $U=-\frac{1}{2}\epsilon_0\chi_E^2$. The total interaction system energy U thus depends on the sign of the real part of dielectric susceptibility $\chi'(\omega)$ and the intensity of the electric field component of the laser beam $E^2$. For a positive $\chi'(\omega)$, U will decrease with increasing laser intensity $E^2$. Thus, a nanotube with positive $\chi'(\omega)$ will tend to move to an area of higher laser intensity. For a focused laser beam, the intensity distribution is normally Gaussian with highest intensity point at the center of the laser beam, where a neutral particle (i.e. nanotube) with a positive $\chi'(\omega)$ will be most stable (i.e. lowest system energy U). This is the principle of optically induced dipole (optical dipole) traps.

Figure 4:
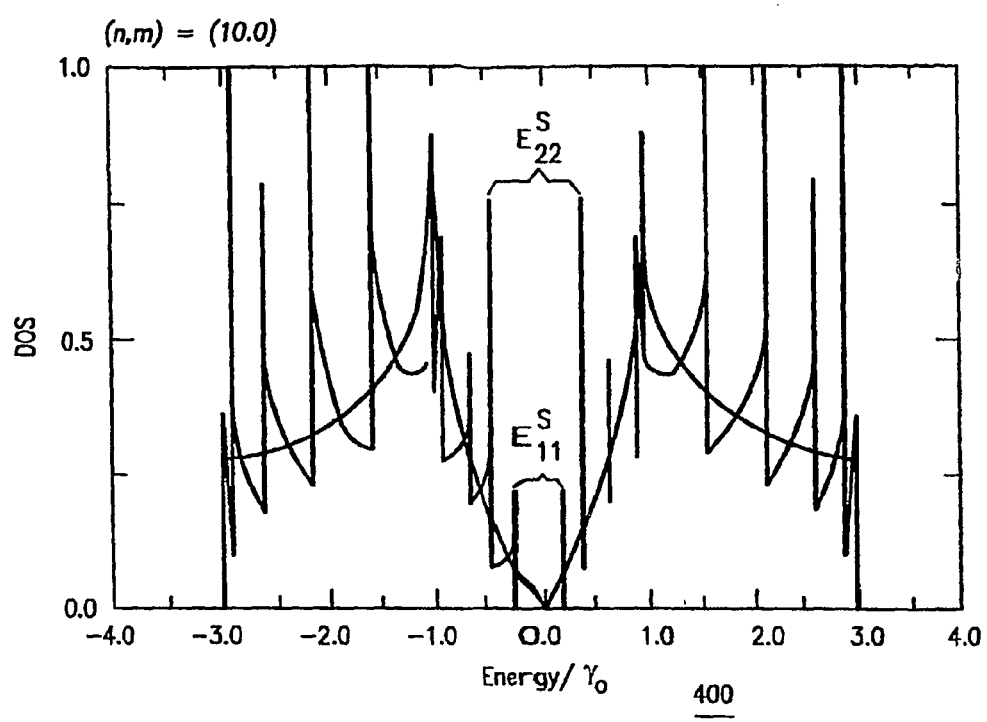
FIG. 4 is a graphical representation showing electron density of states for a semiconductor single-walled carbon nanotube.

Referring back to FIG. 1, in a block 106, the process 100 determines the relationship between the resonant frequency and the diameter and chirality of the target class of single-walled carbon nanotubes. FIG. 4 is a graphical representation showing band structure 400 (energy/$\gamma_0$ with respect to density of states (DOS) of single-walled carbon nanotube and graphite; the dotted line represents graphite) for an example semiconductor single-walled carbon nanotube.

For example, the semiconductor single-walled carbon nanotube bandgap structure 400 includes several peak pairs that are notated as $E_{11}^S$, $E_{22}^S$, etc. These peak pairs are van Hove singularities in the one-dimensional electronic density of states (DOS) for a single-walled carbon nanotube. $E_{11}^S$ is the first energy separation (or bandgap). $E_{22}^S$ is the second energy separation (or bandgap). Each peak pair represents a resonant frequency for the single-walled carbon nanotube. Thus, $E_{11}^S$ represents the first bandgap and the first resonant frequency for the semiconductor single-walled carbon nanotube and $E_{22}^S$ represents the second bandgap and the second resonant frequency for the semiconductor single-walled carbon nanotube.

Figure 5:
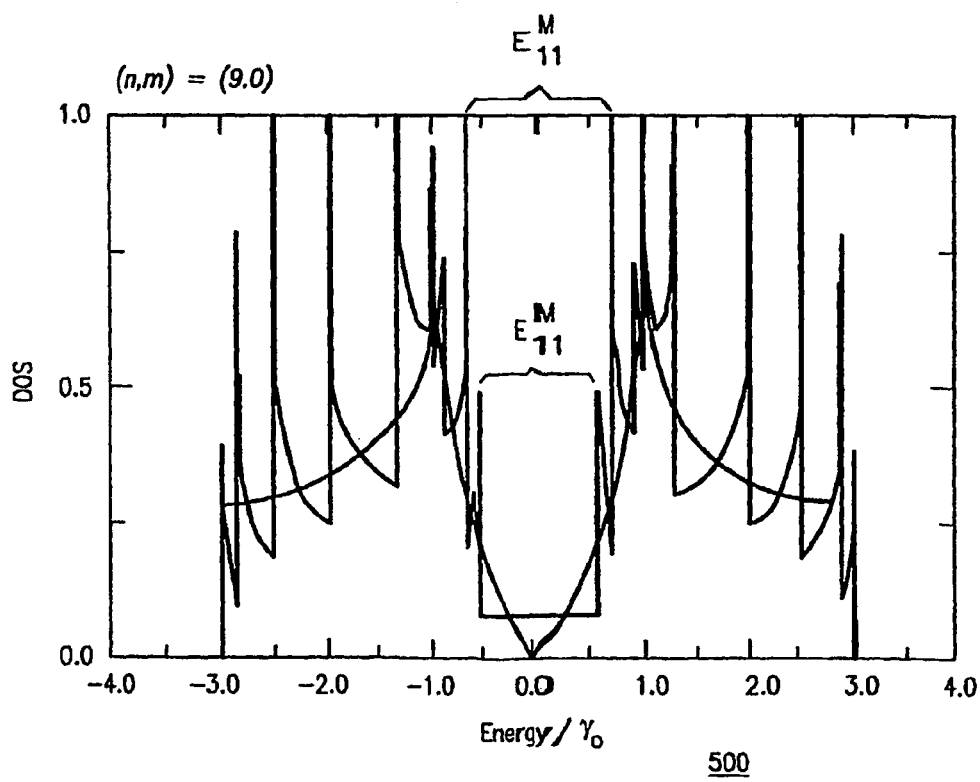
FIG. 5 is a graphical representation showing bandgap electron density of states for a metallic single-walled carbon nanotube.

FIG. 5 is a graphical representation showing band structure 500 (energy/$\gamma_0$ with respect to density of states (DOS) of single-walled carbon nanotube and graphite) for a metallic single-walled carbon nanotube. The metallic single-walled carbon nanotube bandgap structure 500 also includes several peak pairs that are notated as $E_{11}^M$, $E_{22}^M$, etc. $E_{11}^M$ is the first energy separation and $E_{22}^M$ is the second energy separation. Each peak pair represents a resonant frequency for the single-walled carbon nanotube. Thus, $E_{11}^M$ represents the first bandgap and the first resonant frequency for the metallic single-walled carbon nanotube. Note that there are two peak pairs notated as $E_{11}^M$, which may be due to splitting of van Hove singularities caused by trigonal warping effect (i.e., asymmetry near Fermi point in one dimensional electronic structure of the single-walled carbon nanotube).

Note also that the metallic peak pair $E_{11}^M$ is much larger than the semiconductor peak pair $E_{11}^S$ and is even larger than the semiconductor $E_{22}$. In embodiments of the present invention, scanning tunneling microscopy may be used to determine and display atomic structures and electronic density of states for single-walled carbon nanotubes.

Figure 6:
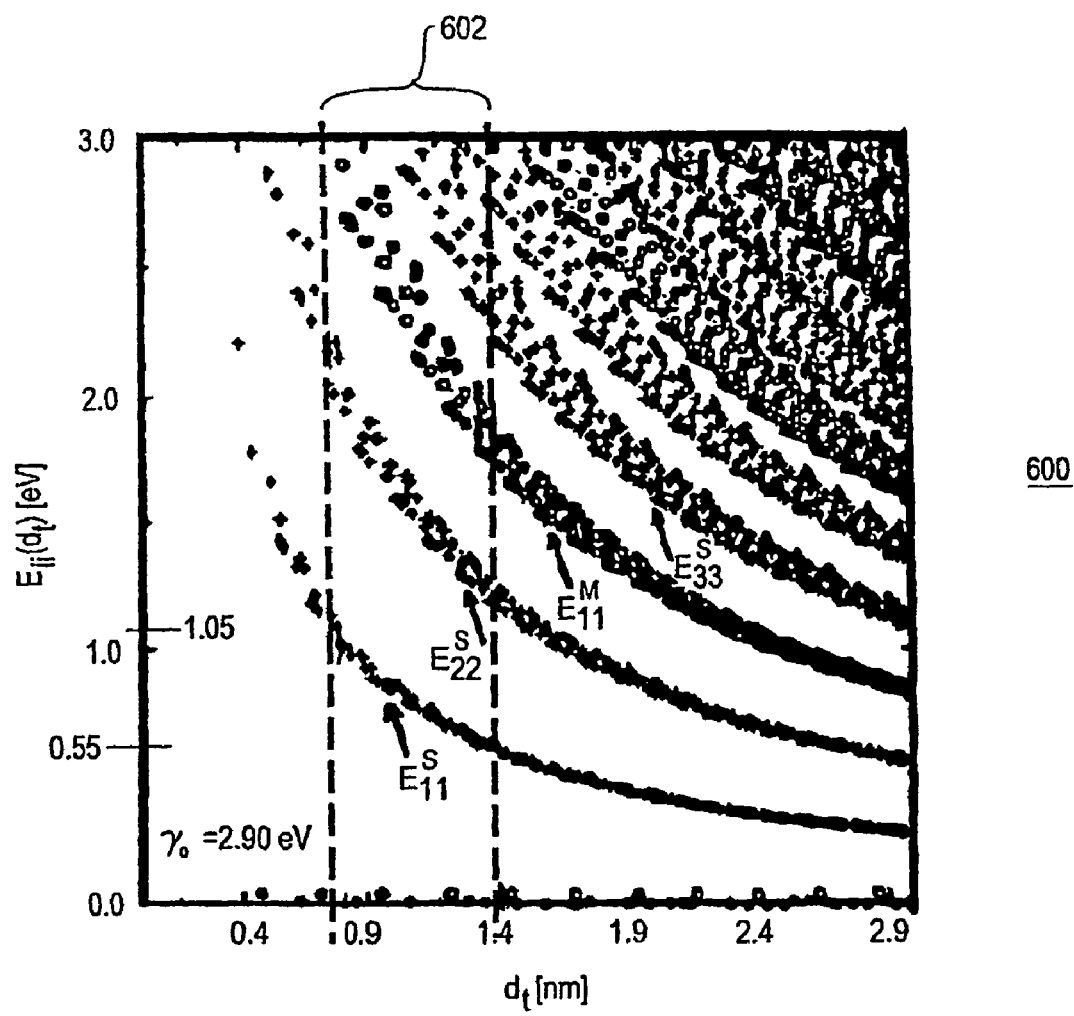
FIG. 6 is a graphical representation showing the relationship between bandgap and diameter for single-walled carbon nanotubes.

The energy gaps between the corresponding van Hove singularities are optically allowed inter-band transition energies. The inter-band transition energies are determined by the diameter and chirality of each single-walled carbon nanotube. FIG. 6 is a graphical representation illustrating a plot 600 of single-walled carbon nanotube resonant frequencies (i.e., inter-band transition energies) with respect to single-walled carbon nanotube diameter.

The plot 600 shows the calculated energy separations $E_{ii}$ (e.g., $E_{11}$, $E_{22}$, $E_{33}$, etc.) between van Hove singularities in the one-dimensional electronic density of states (DOS) of the conduction and valence bands for all (n, m) values of considered single-walled carbon nanotube having diameters $d_t$ in the range of approximately $0.4 < d_t < 3.0$ nanometers (nm). The value for the single-walled carbon-carbon energy overlap integral $\gamma_0$ is 2.9 eV. The nearest neighbor carbon-carbon distance $a_{C-C}$ is 1.42 angstroms (Å). The index i in the inter-band transitions $E_{ii}$ denotes the transition between the ith van Hove singularities, with i=1 being closest to the Fermi energy level taken at E=0.

If Eii is known, then the diameter and chirality of a particular single-walled carbon nanotube can be determined. Note that the bandgap of the single-walled carbon nanotube is inversely proportional to its diameter. For example, in metallic single-walled carbon nanotubes $E_{11}^M \cong 6\, \gamma_0\, a_{C-C}/d_t$. In semiconductor nanotubes $E_{11}^S \cong 2\, \gamma_0\, a_{C-C}/d_t$. This means that as the diameter of the single-walled carbon nanotube increases, the bandgap and resonant frequency decreases.

Depending on chirality, the inter-band transition energies Eii of the single-walled carbon nanotube may deviate from being inversely proportional to the diameter (i.e., may deviate from $E_{11}^M \cong 6\, \gamma_0\, a_{C-C}/d_t$ and $E_{11}^S \cong 2\, \gamma_0\, a_{C-C}/d_t$). As described above, this is due to splitting (in metallic single-walled carbon nanotubes) or shifting (in semiconductor single-walled carbon nanotubes) of van Hove singularities due to trigonal warping effect. This trigonal warping effect happens only if n is not equal m (i.e., armchair single-walled carbon nanotubes).

Referring back to FIG. 1, in a block 108, a mixture of single-walled carbon nanotubes is disposed in a layer in a microfluidic system. The mixture of single-walled carbon nanotubes includes at least one target single-walled carbon nanotube.

Figure 7:
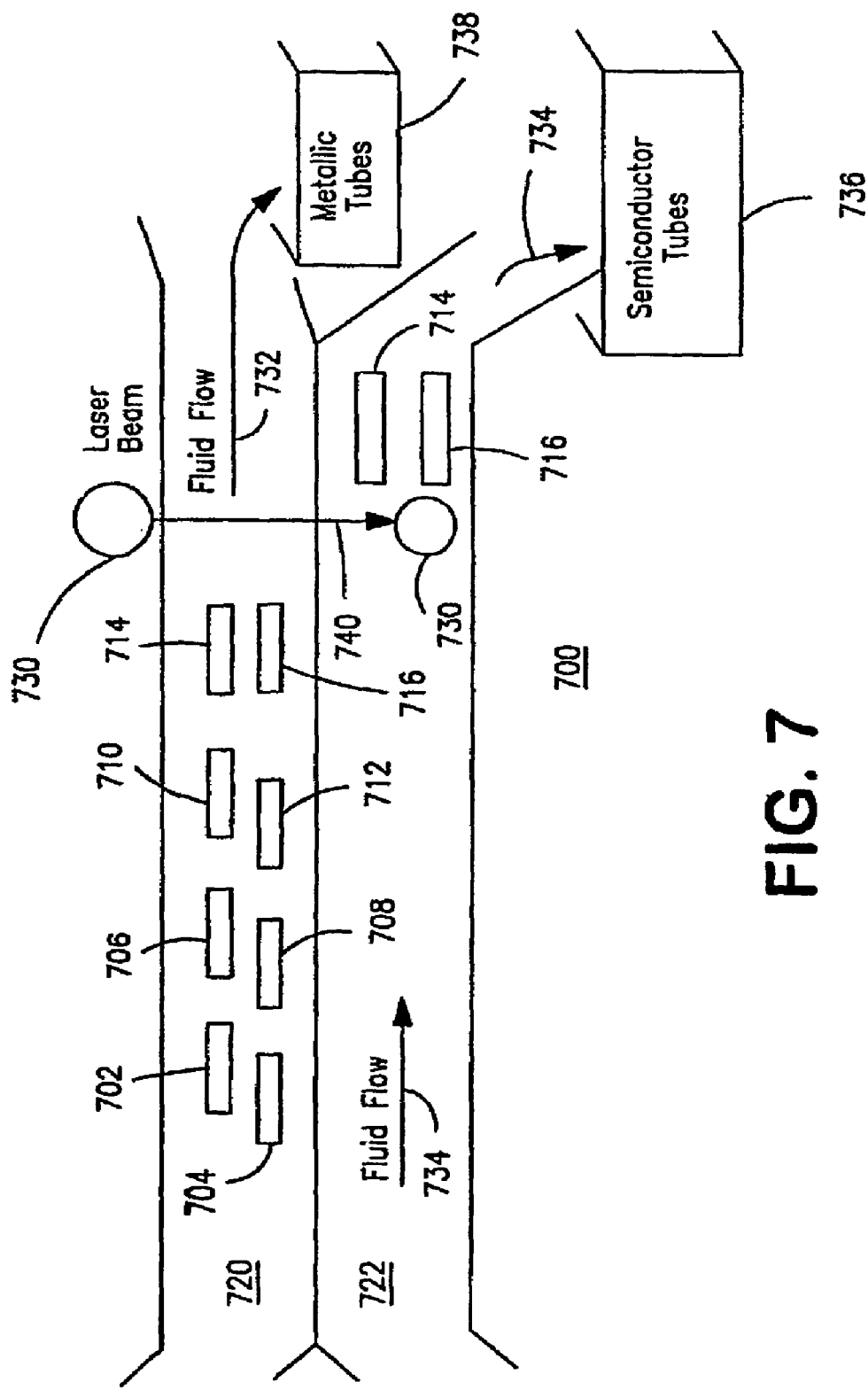
FIG. 7 is a top view of a microfluidic system according to an embodiment of the present invention.

FIG. 7 is a top view of a microfluidic system 700 according to an embodiment of the present invention. The mixture of single-walled carbon nanotubes in the microfluidic system 700 includes several single-walled carbon nanotubes 702, 704, 706, 708, 710, 712, 714, and 716. In the illustrated embodiment, the single-walled carbon nanotubes 714 and 716 are target single-walled carbon nanotubes.

The microfluidic system 700 may include one or more layers (two layers 720 and 722 are shown for simplicity, flowing in a direction 732 and 734, respectively) of viscous fluid (e.g., water) flowing smoothly adjacent to each other in laminar flow. In one embodiment, the mixture of single-walled carbon nanotubes may be disposed in the layer 720.

In one embodiment, the width and height of any one of the layers 720 and 722 may be less than approximately one millimeter (mm).

The flow of the fluid in any one of the layers 720 or 722 can be characterized by the Reynolds number RN, which is represented by RN= $\rho v d / \eta$, where $\rho$ is the fluid density, v is the fluid speed, $\eta$ is the viscosity, and d is a geometrical dimensions associated with the flow (e.g., the width and height of the layer). When the Reynolds number is below approximately 2000, the fluid flow is laminar. When the Reynolds number is above approximately 2000, the fluid flow is turbulent.

The example microfluidic system 700 also includes a laser beam 730. Referring back to FIG. 1, in a block 110, the laser beam 730 is directed at the mixture of single-walled carbon nanotubes. The laser beam 730 may have a frequency that is lower than a resonant frequency of the target single-walled carbon nanotubes. The laser beam 730 induces electric dipoles in the target single-walled carbon nanotubes and traps the target single-walled carbon nanotubes.

In one embodiment, the single-walled carbon nanotubes 714 and 716 are the target semiconductor single-walled carbon nanotubes and the laser beam 730 traps the semiconductor single-walled carbon nanotubes 714 and 716.

Single-walled carbon nanotubes produced using arc discharge, laser ablation, chemical vapor deposition (CVD), or other methods have a certain distribution of diameters. For example, the distribution of single-walled carbon nanotubes made by known high pressure CO disproportionation processes (HiPCO) have diameters that range from approximately 0.8 to 1.3 nm (see area 602). In one embodiment, the energy of the laser beam is chosen below 0.55 eV. In this embodiment, most of the metallic and semiconductor single-walled carbon nanotubes may be trapped because the laser frequency is below the resonant frequency for single-walled carbon nanotubes for $E_{11}^M$ and $E_{11}^S$ (i.e., all of the single-walled carbon nanotubes may be trapped).

In an alternative embodiment, the energy of the laser beam is chosen at around 1.05 eV. In this embodiment, most of the semiconductor single-walled carbon nanotubes are released and all metallic single-walled carbon nanotubes may be trapped because the laser frequency is below the resonant frequency for single-walled carbon nanotubes for $E_{11}^M$ and above the resonant frequency for single-walled carbon nanotubes for $E_{11}^S$ (i.e., traps may be created in only the metallic single-walled carbon nanotubes).

In another embodiment, after the metallic single-walled carbon nanotubes are sorted from the semiconductor single-walled carbon nanotubes the energy in the laser beam is tuned between 0.6–1 eV. In this embodiment, some semiconductor single-walled carbon nanotubes are released and some semiconductor single-walled carbon nanotubes are trapped because the laser frequency is below the resonant frequency for some single-walled carbon nanotubes for $E_{11}^S$ and above the resonant frequency for other single-walled carbon nanotubes for $E_{11}^S$ (i.e., some semiconductor single-walled carbon nanotubes may be trapped but other semiconductor single-walled carbon nanotubes may not be trapped).

In a block 112, the semiconductor single-walled carbon nanotubes 714 and 716 are moved from the layer 720 to the layer 722 and the metallic single-walled carbon nanotubes 702, 704, 706, 708, 710, 712 remain in the layer 720. For example, the focal point of the laser beam 730 may move from the layer 720 to the layer 722. Recall from above that a single-walled carbon nanotube with positive $\chi'(\omega)$ will tend to move to an area of higher laser intensity, which, for a focused laser beam whose intensity distribution is Gaussian, is at the center of the laser beam. Thus, the movement of the focal point of the laser beam 730 from the layer 720 to the layer 722 may cause the semiconductor single-walled carbon nanotubes 714 and 716 to move from the layer 720 to the layer 722.

In one embodiment, a mirror (not shown) may be used to change the position of the focal point of the laser beam 730. For example, the angle of the mirror may be continuously or incrementally changed to change the angle of deflection of the laser beam 730.

In a block 114, the process 100 collects the semiconductor single-walled carbon nanotubes 714 and 716 from the layer 722 in one collection place 736 and the metallic single-walled carbon nanotubes 702, 704, 706, 708, 710, 712 from the layer 720 in another collection place 738.

For purposes of illustrating an alternative embodiment in which it is appropriate to separate group B semiconductor single-walled carbon nanotubes from a mixture of groups A, B, and C semiconductor single-walled carbon nanotubes. Suppose that a resonant frequency of A semiconductor single-walled carbon nanotubes is higher than a resonant frequency of B semiconductor single-walled carbon nanotubes and a resonant frequency of B semiconductor single-walled carbon nanotubes is higher than a resonant frequency of C semiconductor single-walled carbon nanotubes.

Figure 8:
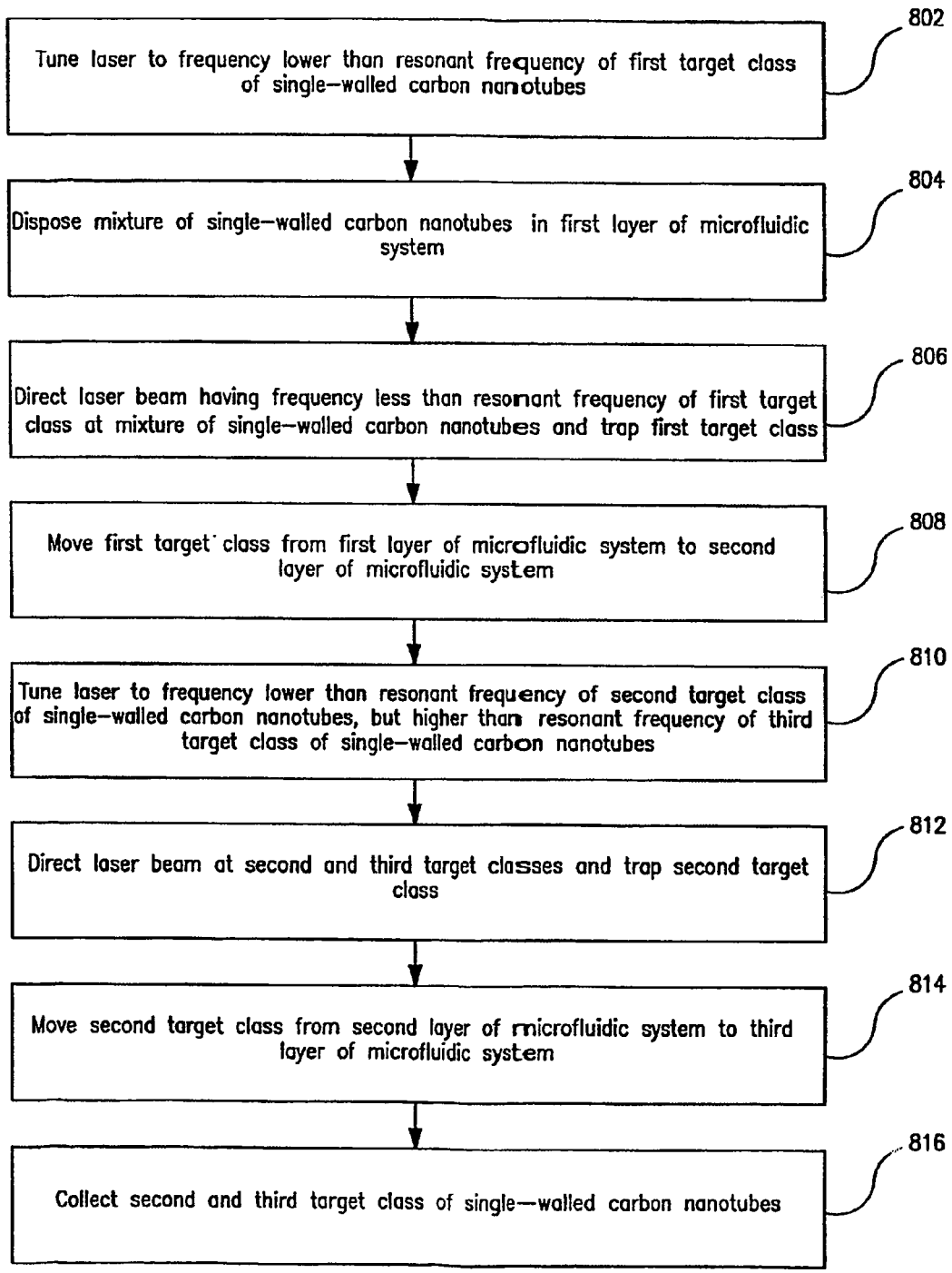
FIG. 8 is a flow chart illustrating process for sorting semiconductor single-walled carbon nanotubes according to an embodiment of the present invention
Figure 9:
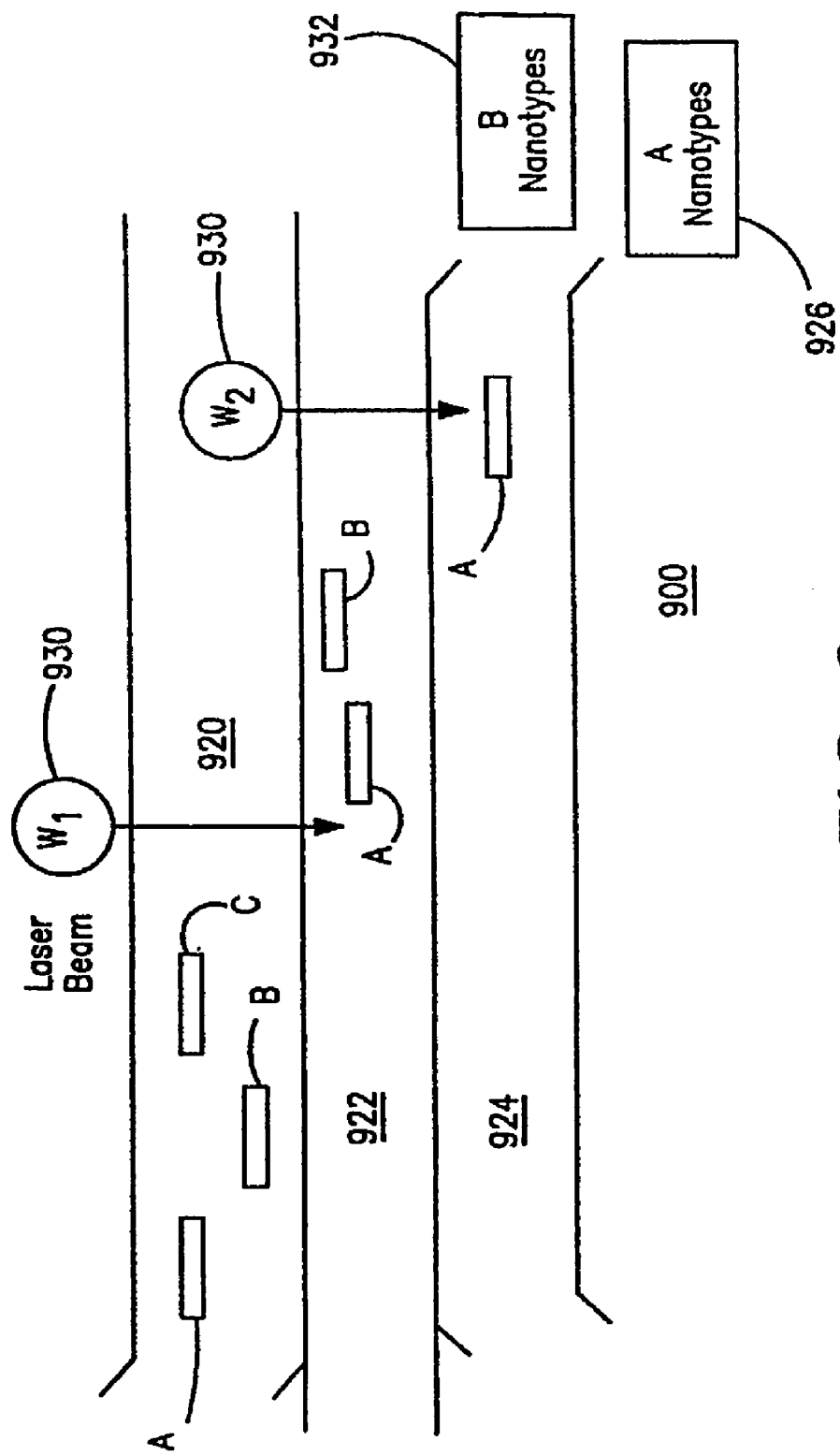
FIG. 9 is a top view of a microfluidic system suitable for implementing the process illustrated in FIG. 8 according to an embodiment of the present invention.

FIG. 8 is a flow chart illustrating process 800 for sorting B semiconductor single-walled carbon nanotubes from the A and C semiconductor single-walled carbon nanotubes according to an embodiment of the present invention. FIG. 9 is a top view of a microfluidic system 900 suitable for implementing the process 800 according to an embodiment of the present invention.

The process 800 will be described as multiple discrete operations performed in turn in a manner that is most helpful in understanding embodiments of the present invention. However, the order in which the operations are described should not be construed to imply that the operations are necessarily order dependent or that they be performed in the order in which they are presented. Of course, the process 800 is only an example process and other processes may be used.

In a block 802, the laser beam 930 is tuned to a frequency $\omega_1$ that is lower than the resonant frequency of the B semiconductor single-walled carbon nanotubes and higher than C semiconductor single-walled carbon nanotubes.

In a block 804, the mixture of A, B, and C semiconductor single-walled carbon nanotubes is disposed in a first microfluidic layer 920 in laminar flow.

In a block 806, the mixture of A, B, and C semiconductor single-walled carbon nanotubes flows to the laser beam 930 and the laser beam 930 traps the A and B single-walled carbon nanotubes.

In a block 808, the focal point of the laser beam 930 moves, which moves the A and B single-walled carbon nanotubes to a second microfluidic layer 922 in laminar flow while the C single-walled carbon nanotubes remain in the first microfluidic layer 920.

In a block 810, the laser beam 930 is tuned to a frequency $\omega_2$ that is higher than the resonant frequency of the B semiconductor single-walled carbon nanotubes but that is lower than the resonant frequency of the A semiconductor single-walled carbon nanotubes.

In a block 812, the mixture of the A and B semiconductor single-walled carbon nanotubes flows to the laser beam 930 and the laser beam 930 traps the A single-walled carbon nanotubes.

In a block 814, the laser beam 930 moves the A semiconductor single-walled carbon nanotubes to a third microfluidic layer 924 in laminar flow while the B single-walled carbon nanotubes remain in the second microfluidic layer 922.

In a block 816, the process 800 collects the A semiconductor single-walled carbon nanotubes from the third layer 924 in a collector 926 and collects the B semiconductor single-walled carbon nanotubes from the second layer 922 in a collector 932.

Figure 10:
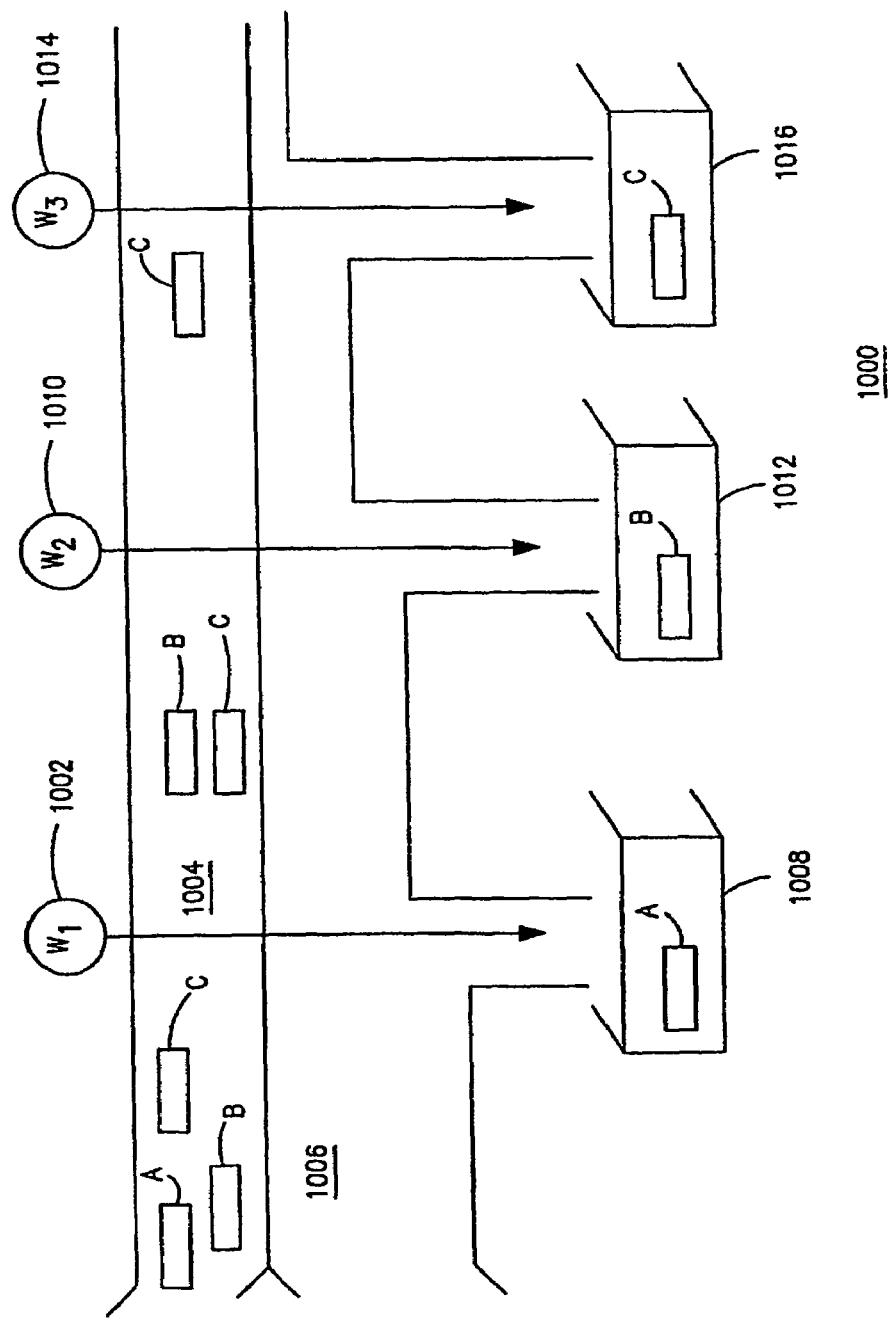
FIG. 10 is a top view of a microfluidic system suitable for sorting semiconductor single-walled carbon nanotubes according to an alternative embodiment of the present invention.

FIG. 10 illustrates a microfluidic system 1000 suitable for sorting A, B, and C semiconductor single-walled carbon nanotubes according to an alternative embodiment of the present invention. This embodiment may be appropriate when the resonant frequency of the A semiconductor single-walled carbon nanotubes is higher than the resonant frequency of the B semiconductor single-walled carbon nanotubes and the resonant frequency of the B semiconductor single-walled carbon nanotubes is higher than the resonant frequency of the C semiconductor single-walled carbon.

The laser beam 1002 may be tuned to a frequency $\omega_1$ that is lower than the resonant frequency of the A semiconductor single-walled carbon nanotubes but higher than the resonant frequency of the B semiconductor single-walled carbon nanotubes. The laser beam 1002 may trap the A semiconductor single-walled carbon nanotubes and move the A semiconductor single-walled carbon nanotubes from the microfluidic layer 1004 to the microfluidic layer 1006 to the collector 1008. The B and C semiconductor single-walled carbon nanotubes remain in the microfluidic layer 1004.

The laser beam 1010 may then be tuned to a frequency $\omega_2$ that is lower than the resonant frequency of the B semiconductor single-walled carbon nanotubes but higher than the resonant frequency of the C semiconductor single-walled carbon nanotubes. The laser beam 1010 may trap the B semiconductor single-walled carbon nanotubes and move B semiconductor single-walled carbon nanotubes from the microfluidic layer 1004 to the microfluidic layer 1006 to the collector 1012. The C semiconductor single-walled carbon nanotubes may remain in the microfluidic layer 1004.

The laser beam 1014 may be tuned to a frequency $\omega_3$ that is lower than the resonant frequency of the C semiconductor single-walled carbon nanotubes. The laser beam 1014 may trap the C semiconductor single-walled carbon nanotubes and move the C semiconductor single-walled carbon nanotubes from the microfluidic layer 1004 to the microfluidic layer 1006 to the collector 1016.

It is very common for the batch of single-walled carbon nanotubes provided by single-walled carbon nanotube manufacturers to potential users to aggregate together and form bundles similar to ropes due to very strong van der Waals forces. In one embodiment of the present invention, a batch of single-walled carbon nanotubes may be functionalized prior to sorting using optical dipole traps. For example, the batch of single-walled carbon nanotubes is dispersed in an aqueous surfactant solution to un-bundle them. Suitable surfactants are known (e.g., sodium dodecyl sulfate (SDS)).

In one embodiment of the present invention, a tunable laser provides the laser beam. The tunable laser therefore may be able to scan across frequencies or switch among frequencies. In an alternative embodiment, multiple lasers may be used to provide the laser beams. The laser beams may have the same frequency to provide high efficiency trapping of a target class of single-walled carbon nanotubes (i.e., the laser beams may be directed toward the target class of carbon nanotubes simultaneously so that substantially all of the target class of single-walled carbon nanotubes may be trapped in one pass). Alternatively still, the multiple laser beams having the same frequency may be directed toward the target class of carbon nanotubes sequentially so that substantially all of the target class of single-walled carbon nanotubes may be trapped in a serial manner. The laser beam sweeping speed across the microfluidic flows may be fast enough so that all of the target single-walled carbon nanotubes may be removed in one pass.

Although for simplicity only one microfluidic system is described, in embodiments, several microfluidic systems may be used to sort single-walled carbon nanotubes. For example, two or more microfluidic systems can be implemented in parallel with each other. Alternatively, two or more microfluidic systems can be implemented in series with each other. After reading the description herein, a person of ordinary skill in the relevant art will readily recognize how to implement embodiments of the present invention using two or more microfluidic systems.

Figure 11:
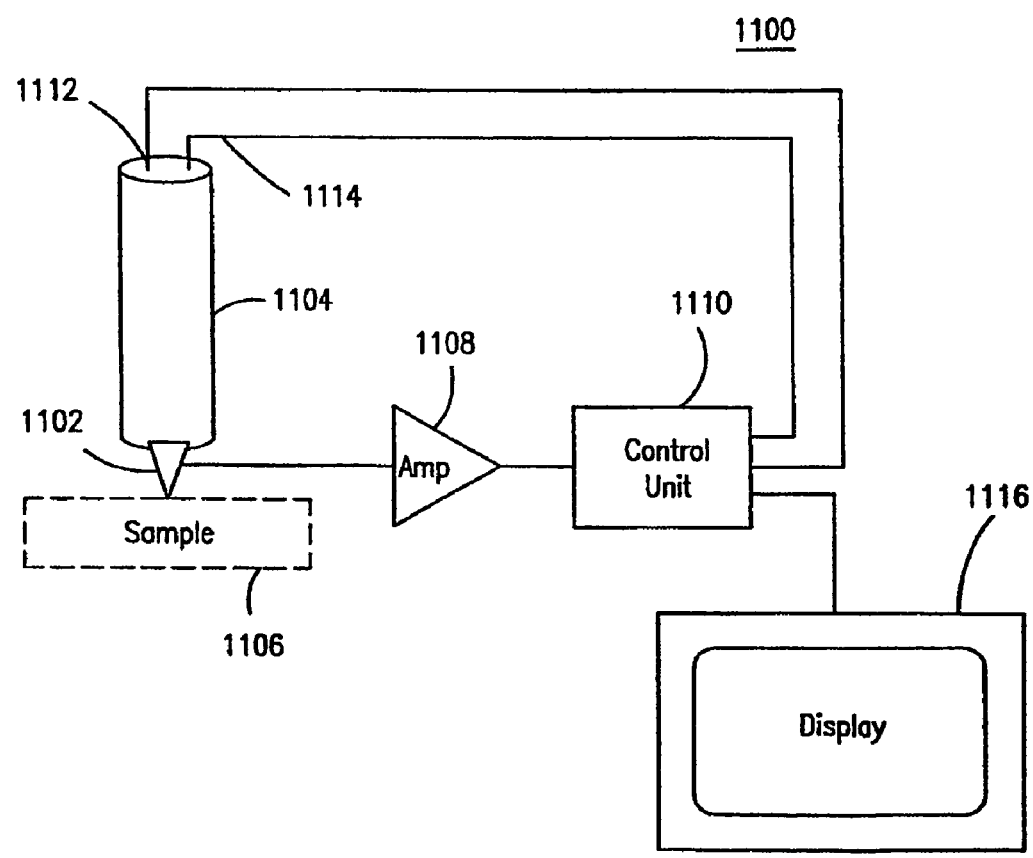
FIG. 11 is a high-level block diagram of a system suitable for using single-walled carbon nanotubes sorted according to embodiments of the present invention.

FIG. 11 is a high-level block diagram of a system 1100 suitable for using single-walled carbon nanotubes sorted according to embodiments of the present invention. The system 1100 may be a scanning tunneling microscope including a single-walled carbon nanotube tip 1102, a piezoelectric tube 1104 coupled to the control the distance of the tip 1102 from a sample 1106, which is in dotted lines because it is not part of the system 1100, a tunneling current amplifier 1108 to amplify tunneling current from the tip 1102, a control unit 1110 coupled to provide voltage to electrodes 1112 and 1114 on the tube 1104, and a display 1116 to display results of scanning the sample 1106. Scanning tunneling microscopes suitable for using single-walled carbon nanotubes sorted according to embodiments of the present invention are known.

Other systems suitable for using single-walled carbon nanotubes sorted by bandgap (i.e., optical dipole resonant frequency) according to embodiments of the present invention include transistor fabrication systems. For example, in many devices transistor bandgap is controlled so that all transistors on a particular device have the same bandgap. This ensures that all transistors have the same threshold voltage. Other systems suitable for using single-walled carbon nanotubes sorted according to embodiments of the present invention include battery manufacturing systems, and fuel cell manufacturing systems.

Embodiments of the present invention may be implemented using hardware, software, or a combination thereof. In implementations using software, the software may be stored on a machine-accessible medium. A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable and non-recordable media (e.g., read only memory [ROM], random access memory [RAM], magnetic disk storage media, optical storage media, flash memory devices, etc.), as well as electrical, optical, acoustic, or other form of propagated signals (e.g., carrier waves, infrared signals, digital signals, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the embodiments of the invention, as those skilled in the relevant art will recognize. These modifications can be made to embodiments of the invention in light of the above detailed description.

In the above description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the present invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method, comprising:
    directing a laser beam at a mixture of carbon nanotubes disposed in a microfluidic layer in laminar flow, the laser beam having a frequency less than a resonant frequency of at least one target class of carbon nanotubes, the resonant frequency determined by diameter and chirality of the target class of carbon nanotubes, the mixture including at least one target class of carbon nanotube;
    trapping at least one target carbon nanotube; and
    moving the target carbon nanotube into a second microfluidic layer in laminar flow.

2. The method of claim 1, further comprising identifying the resonant frequency of the target class of carbon nanotubes.

3. The method of claim 2, further comprising determining diameter and chirality of the target class of carbon nanotubes.

4. The method of claim 3, further comprising determining a relationship between diameter, chirality, and resonant frequency of the target class of carbon nanotubes.

5. The method of claim 1, further comprising collecting at least one target carbon nanotube from the second microfluidic layer in laminar flow.

6. The method of claim 1, further comprising un-bundling the mixture of carbon nanotubes.

7. The method of claim 1, wherein the target class of carbon nanotubes are metallic single-walled carbon nanotubes.

8. The method of claim 1, wherein the target class of carbon nanotubes are semiconductor single-walled carbon nanotubes.

9. The method of claim 1, wherein, the mixture of carbon nanotubes includes another target class of carbon nanotubes, the method further comprising:
    directing a laser beam having another laser frequency at the mixture of carbon nanotubes, the another laser frequency being less than a next resonant frequency of the next target class of carbon nanotubes, the other resonant frequency determined by diameter and chirality of the other target class of carbon nanotubes;
    trapping the other target class of carbon nanotubes; and
    moving the other target class of carbon nanotubes into a third microfluidic layer.

10. The method of claim 1, further comprising:
    directing another laser beam having a laser frequency less than the resonant frequency of the target class of carbon nanotubes at the mixture of carbon nanotubes; and
    trapping the target class of carbon nanotubes; and
    moving the target carbon nanotubes into the second microfluidic layer.

11. The method of claim 1, wherein the microfluidic layer is water.

12. An apparatus, comprising:
    a laser to emit a laser beam having a frequency lower than a resonant frequency corresponding to a target class of carbon nanotubes, the resonant frequency determined by diameter and chirality of the target class of carbon nanotubes;

a first microfluidic layer in laminar flow, the first microfluidic layer having a mixture of carbon nanotubes, the mixture of carbon nanotubes having at least one target carbon nanotube; and a second microfluidic layer in laminar flow, the second microfluidic layer in proximity with the first fluid, the laser beam optically coupled to induce at least one optical dipole trap in the target carbon nanotube and to move the target carbon nanotube into the second microfluidic layer.

13. The apparatus of claim 12, wherein the first and second microfluidic layers comprise water.

14. The apparatus of claim 12, wherein the target class of carbon nanotubes is metallic single-walled carbon nanotubes.

15. The apparatus of claim 12, wherein the target class of carbon nanotubes is semiconductor single-walled carbon nanotubes.

16. The apparatus of claim 12, further comprising a third microfluidic layer in laminar flow, the third microfluidic layer in proximity with the second microfluidic layer.

17. The apparatus of claim 16, wherein the laser beam is coupled to emit a next frequency lower than a resonant frequency corresponding to a next target class of carbon nanotubes in the mixture of carbon nanotubes, the next resonant frequency determined by diameter and chirality of the next target class of carbon nanotubes, the laser beam being optically coupled to trap the next target class of carbon nanotubes and to move the next target class of carbon nanotubes into the third microfluidic layer.

18. The apparatus of claim 12, further comprising a first collector to collect the target class of carbon nanotubes.

19. A system, comprising:

an apparatus coupled to direct a laser beam at a mixture of carbon nanotubes disposed in a microfluidic layer in laminar flow, the laser beam having a laser frequency less than a resonant frequency of at least one target class of carbon nanotubes, the resonant frequency determined by diameter and chirality of the target class of carbon nanotubes, the mixture including at least one target class of carbon nanotube, the laser beam to move the target carbon nanotube into a second microfluidic layer in laminar flow, the apparatus to collect the target carbon nanotube from the microfluidic layer in laminar flow; and a piezoelectric tube coupled to the collected target carbon nanotube.

20. The system of claim 19, further comprising a current amplifier coupled to the collected target carbon nanotube.

21. The system of claim 20, further comprising a display coupled to the current amplifier.

22. An article of manufacture, comprising:

a machine-accessible medium including data that, when accessed by a machine, cause the machine to perform the operations comprising:

directing a laser beam at a mixture of carbon nanotubes disposed in a microfluidic layer in laminar flow, the laser beam having a frequency less than a resonant frequency of at least one target class of carbon nanotubes, the resonant frequency determined by diameter and chirality of the target class of carbon nanotubes, the mixture including at least one target class of carbon nanotube;

trapping at least one target carbon nanotube; and moving the target carbon nanotube into a second microfluidic layer in laminar flow.

23. The article of manufacture of claim 22, wherein the machine-accessible medium further includes data that cause the machine to perform operations comprising identifying the resonant frequency of the target class of carbon nanotubes.

24. The article of manufacture of claim 23, wherein the machine-accessible medium further includes data that cause the machine to perform operations comprising identifying the diameter and chirality corresponding to the resonant frequency of the target class of carbon nanotubes.

25. The article of manufacture of claim 24, wherein the machine-accessible medium further includes data that cause the machine to perform operations comprising determining a relationship between diameter, chirality, and resonant frequency of the target class of carbon nanotubes.

26. The article of manufacture of claim 22, wherein the machine-accessible medium further includes data that cause the machine to perform operations comprising collecting the target carbon nanotube from the second microfluidic layer in laminar flow.

27. The article of manufacture of claim 22, wherein the machine-accessible medium further includes data that cause the machine to perform operations comprising un-bundling the mixture of carbon nanotubes.

* * * * *